US010814823B2

(12) United States Patent
Jaradi et al.

(10) Patent No.: US 10,814,823 B2
(45) Date of Patent: Oct. 27, 2020

(54) VEHICLE ENERGY ABSORBER

(71) Applicant: Ford Global Technologies, LLC, Dearborn, MI (US)

(72) Inventors: Dean M. Jaradi, Macomb, MI (US); Agnes S. Kim, Dearborn, MI (US); Rongrong Zhou, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 88 days.

(21) Appl. No.: 15/690,079

(22) Filed: Aug. 29, 2017

(65) Prior Publication Data

US 2019/0061673 A1 Feb. 28, 2019

(51) Int. Cl.
*B60R 21/207* (2006.01)
*B60R 21/231* (2011.01)
*B60R 21/2338* (2011.01)
*B60R 21/00* (2006.01)

(52) U.S. Cl.
CPC ........ *B60R 21/2338* (2013.01); *B60R 21/207* (2013.01); *B60R 21/231* (2013.01); *B60R 2021/0004* (2013.01); *B60R 2021/0032* (2013.01); *B60R 2021/0048* (2013.01); *B60R 2021/23153* (2013.01); *B60R 2021/23382* (2013.01)

(58) Field of Classification Search
CPC ............. B60R 21/207; B60R 21/2338; B60R 2021/23153; B60R 2021/23382; B60R 2021/23384
See application file for complete search history.

(56) References Cited

U.S. PATENT DOCUMENTS

| | | | |
|---|---|---|---|
| 4,565,535 A * | 1/1986 | Tassy | B60R 21/16 244/121 |
| 6,283,500 B1 | 9/2001 | Eckert et al. | |
| 7,926,840 B1 | 4/2011 | Choi | |
| 8,544,882 B2 | 10/2013 | Gulde et al. | |
| 8,807,596 B1 * | 8/2014 | Co | B60R 21/2338 280/743.2 |
| 10,421,427 B2 * | 9/2019 | Nakanishi | B60R 21/26 |
| 2004/0012179 A1 * | 1/2004 | Pinsenschaum | B60R 21/233 280/739 |
| 2004/0090055 A1 * | 5/2004 | Kassman | B60R 21/233 280/743.2 |
| 2004/0119271 A1 * | 6/2004 | Webber | B60R 21/217 280/731 |

(Continued)

FOREIGN PATENT DOCUMENTS

| | | |
|---|---|---|
| CN | 102390345 A | 3/2012 |
| CN | 205131175 U | 4/2016 |
| JP | 5999031 B2 | 9/2016 |

*Primary Examiner* — Barry Gooden, Jr.
(74) *Attorney, Agent, or Firm* — Frank A. MacKenzie; Bejin Bieneman PLC

(57) ABSTRACT

A system includes a seat. The system includes an airbag supported by the seat. The airbag is inflatable to an inflated position. The airbag includes an inflation chamber and a panel adjacent to the inflation chamber defining a concave impact surface in the inflated position. The system includes a tether having a first end attached to a side of the airbag and a second end attached to the panel. The inflation chamber is beneath the concave impact surface in the inflated position.

16 Claims, 4 Drawing Sheets

(56) References Cited

U.S. PATENT DOCUMENTS

| | | | | |
|---|---|---|---|---|
| 2009/0230663 A1* | 9/2009 | Mills | ................ | B60R 21/233 280/735 |
| 2009/0295135 A1* | 12/2009 | Kumagai | ............ | B60R 21/233 280/743.1 |
| 2010/0102542 A1* | 4/2010 | Nakajima | ............ | B60R 21/233 280/743.2 |
| 2011/0062693 A1* | 3/2011 | Williams | ............ | B60R 21/2338 280/743.2 |
| 2011/0148080 A1* | 6/2011 | Marable | ............... | B60R 21/233 280/730.2 |
| 2013/0087995 A1* | 4/2013 | Lee | ...................... | B60R 21/214 280/728.2 |
| 2015/0091281 A1* | 4/2015 | Nagasawa | ............ | B60N 2/4228 280/730.1 |
| 2015/0217716 A1* | 8/2015 | Anderson | ........... | B60R 21/2338 280/729 |
| 2016/0001733 A1* | 1/2016 | Kim | ...................... | B60R 21/233 280/728.3 |
| 2016/0107598 A1* | 4/2016 | Fischer | ................ | B60R 21/231 280/729 |
| 2017/0129439 A1* | 5/2017 | Taguchi | ................ | B60R 21/205 |
| 2017/0166159 A1* | 6/2017 | Shin | ..................... | B60R 21/231 |
| 2017/0217397 A1* | 8/2017 | Sumiya | ................. | B60R 21/233 |
| 2017/0217399 A1* | 8/2017 | Patel | ................... | B60R 21/233 |
| 2017/0259772 A1* | 9/2017 | Farooq | .................. | B60N 3/001 |
| 2017/0320460 A1* | 11/2017 | Roychoudhury | ..... | B60R 21/239 |
| 2017/0361800 A1* | 12/2017 | Ohachi | ................. | B60R 21/231 |
| 2018/0001863 A1* | 1/2018 | Nakanishi | ............. | B60R 21/203 |
| 2018/0043852 A1* | 2/2018 | Fischer | ................ | B60R 21/231 |
| 2018/0065583 A1* | 3/2018 | Tabushi | ............... | B60R 21/233 |
| 2018/0111581 A1* | 4/2018 | Wang | .................... | B60R 21/205 |
| 2018/0148013 A1* | 5/2018 | Anderson | ........... | B60R 21/2338 |
| 2018/0162310 A1* | 6/2018 | Szawarski | ........... | B60R 21/2342 |
| 2018/0194317 A1* | 7/2018 | Barbat | .................... | B60N 2/90 |
| 2018/0319358 A1* | 11/2018 | Schneider | ............. | B60R 21/233 |
| 2018/0354450 A1* | 12/2018 | Yamada | ............ | B60R 21/23138 |
| 2019/0016294 A1* | 1/2019 | Hayashi | ................ | B60R 21/237 |
| 2019/0054887 A1* | 2/2019 | Castillo Jaime | ...... | B60R 21/231 |
| 2019/0077356 A1* | 3/2019 | Patel | ..................... | B60R 21/216 |
| 2019/0111878 A1* | 4/2019 | Faruque | ................. | B60R 21/02 |
| 2019/0283702 A1* | 9/2019 | Yamada | ................ | B60R 21/233 |

\* cited by examiner

VEHICLE ENERGY ABSORBER

BACKGROUND

An interior of a vehicle, such as an automobile, typically includes various devices for absorbing energy from an occupant of the vehicle during an impact of the vehicle. For example, the vehicle may include one or more airbags supported by a seat, a steering wheel, an instrument panel, and/or a roof of the vehicle. The airbags may be configured to absorb energy and soften impact between the body of the occupant and interior components of the vehicle.

Energy absorbers may be passive, e.g., not activated before impact, or may be active, e.g., deployed when impact is sensed. Active energy absorbers are desired for some applications in the interior of the vehicle. During an impact, the occupant may move forward in the vehicle toward a vehicle component, e.g., a seat, a pillar, etc. There remains an opportunity to design an airbag to absorb energy from the occupant moving forward during the impact.

DETAILED DESCRIPTION

Figure 1:
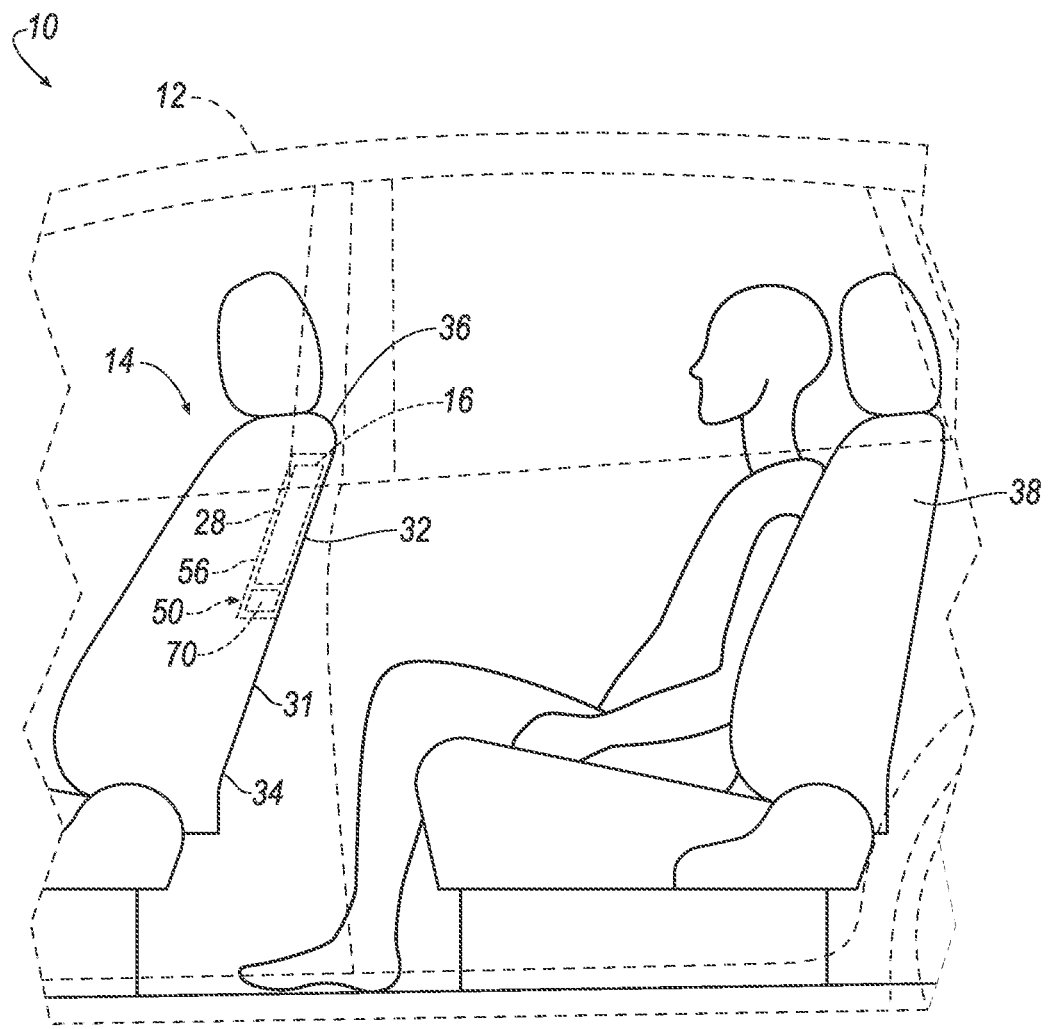
FIG. 1 is a side view of a vehicle including an airbag in an uninflated position.

A system includes a seat, an airbag supported by the seat and inflatable to an inflated position and including an inflation chamber and a panel adjacent to the inflation chamber defining a concave impact surface in the inflated position, and a tether having a first end attached to a side of the airbag and a second end attached to the panel. The inflation chamber is beneath the concave impact surface in the inflated position.

The seat may include a seat back, and the airbag may be supported by the seat back.

The system may include a second tether having a first end attached to the side of the airbag and a second end attached to the panel. The system may include a third tether, wherein the airbag may have a second side opposite the side, a third side connected to the side and to the second side, and a fourth side connected to the side and to the second side and opposing the third side, the first tether and the second tether may each extend from the side of the airbag to the panel and the third tether may extend between the third side and the fourth side.

The system may include a second seat, wherein when the airbag is in the inflated position, the inflation chamber may extend toward the second seat.

The airbag may include a top and a bottom, and the inflation chamber may be disposed between the bottom of the airbag and the panel.

The seat may include an upper portion and a lower portion, and the airbag may be supported by the upper portion.

The system may include an actuator programmed to inflate the airbag to the inflated position upon detection of an impact.

The system may include an airbag housing, wherein the side of the airbag may be attached to the airbag housing.

The tether may define a concavity of the concave impact surface.

A system includes a seat including a top and an airbag supported by the seat inflatable to an inflated position including a first side and a second side disposed opposite the first side, an inflation chamber, and a panel in the second side adjacent to the inflation chamber defining a concave impact surface. When the airbag is in the inflated position, the airbag is disposed above the top of the seat and the inflation chamber is disposed beneath the concave impact surface.

The system may further include a tether extending from the first side to the second side, wherein when the airbag is in the inflated position, the tether extends from the first side to the panel. The airbag may include a third side and a fourth side disposed opposite the third side, and the system may further include a second tether extending from the third side to the fourth side. The system may include a second tether extending from the first side to the second side, wherein when the airbag is in the inflated position, the second tether extends from the first side to the panel. The tether may define a concavity of the concave impact surface.

The airbag may include a top and a bottom, and the inflation chamber may be disposed between the bottom of the airbag and the panel.

The system may include an actuator programmed to inflate the airbag to the inflated position upon detection of an impact.

The system may include a second seat, wherein when the airbag is in the inflated position, the inflation chamber may extend toward the second seat.

The system may include an airbag housing, wherein the first side of the airbag may be attached to the airbag housing.

The seat may include an upper portion and a lower portion, and the airbag may be supported by the upper portion.

With reference to the Figures, wherein like numerals indicate like parts throughout the several views, a system 10 in a vehicle 12 includes a seat 14 and an airbag 16 supported by the seat 14. The airbag 16 is inflatable to an inflated position. The airbag 16 includes an inflation chamber 18 and a panel 20 adjacent to the inflation chamber 18. The panel 20 defines a concave impact surface 22 in the inflated position. The system 10 includes a tether 24 having a first end 26 attached to a side 28 of the airbag 16 and a second end 30 attached to the panel 20. The inflation chamber 18 is beneath the concave impact surface 22 in the inflated position.

Because the airbag 16 includes the concave impact surface 22 and the inflation chamber 18 beneath the concave impact surface 22, the airbag 16 may receive an occupant, e.g., a rear occupant in the vehicle 12. The airbag 16 may receive an upper portion of an occupant's body (e.g., an occupant's head) during a vehicle impact. The concave impact surface 22 and the inflation chamber 18 may absorb energy from an upper portion of the occupant during a frontal impact, e.g., a head and neck. Because the airbag 16 is installed in the seat 14 in front of the occupant, the airbag 16 can present the concave impact surface 22 to the occupant upon inflation. Furthermore, the airbag 16 can accommodate occupants of differing sizes.

The adjectives "first," "second," "third," etc., are used herein merely as modifiers and are not intended to indicate order or importance.

The vehicle 12 may be any suitable type of vehicle 12, e.g., an automobile, including a sedan, a pick-up truck, a sport-utility vehicle, etc. The vehicle 12 may be an autonomous vehicle 12. For example, the vehicle 12 may have a computer that may control the operations of the vehicle 12 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicle propulsion, braking, and steering; in a non-autonomous mode, a human operator controls the vehicle propulsion, braking, and steering.

Figure 2:
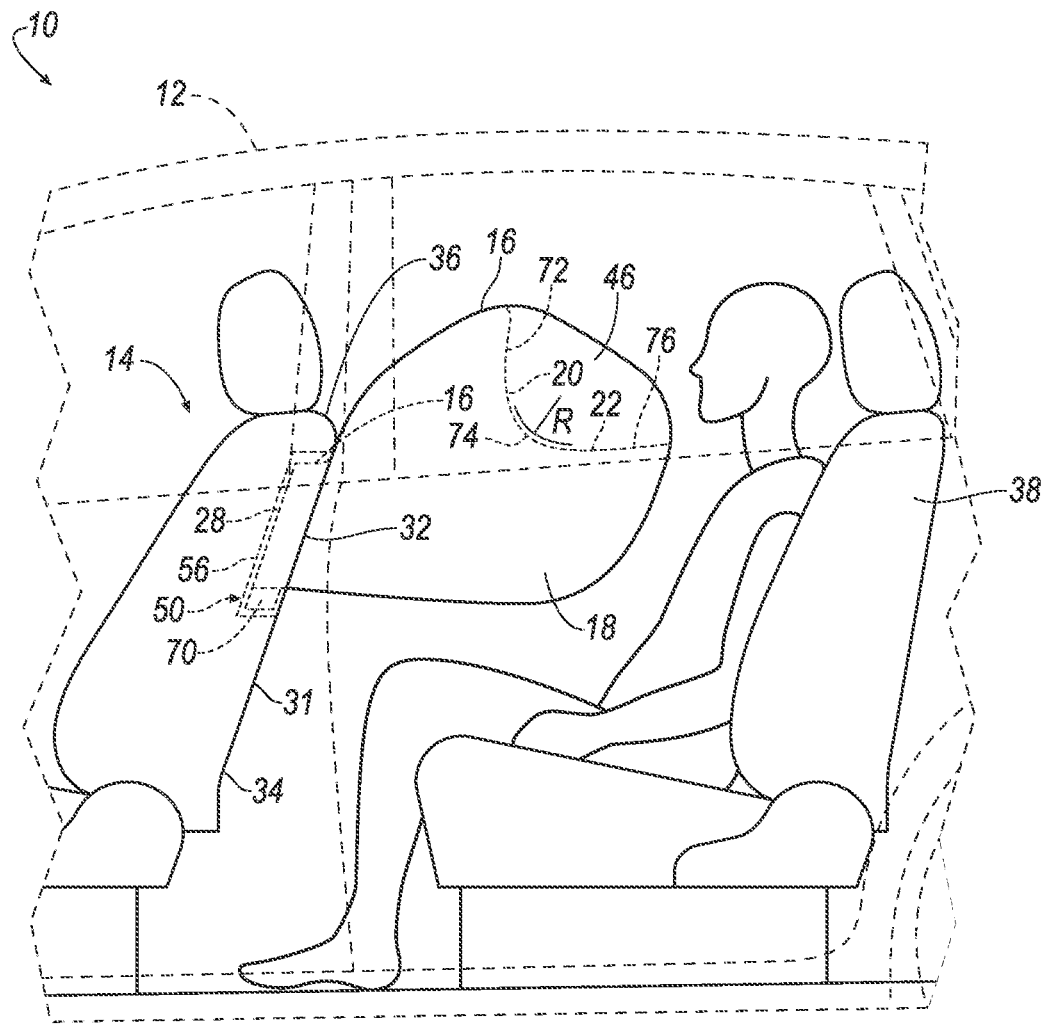
FIG. 2 is a side view of the vehicle including the airbag in an inflated position.

As shown in FIGS. 1-2, the system 10 includes the seat 14. The seat 14 may include a seat back 31. The seat back 31 may have an upper portion 32 and a lower portion 34. The upper portion 32 may include a top 36. The airbag 16 may be supported by the upper portion 32 of the seat 14. When the airbag 16 is in the inflated position, the airbag 16 may be disposed above the top 36 of the seat 14.

As shown in FIGS. 1-2, the system 10 may include a second seat 38. The second seat 38 may be disposed in a vehicle-rear direction relative to the seat 14. The airbag 16 may inflate toward the second seat 38. When the airbag 16 is in the inflated position, the inflation chamber 18 may extend toward the second seat 38. The second seat 38 may support an occupant in the vehicle 12, e.g., the occupant moving toward the airbag 16 during the vehicle impact.

As shown in FIGS. 1-2, the system 10 includes an airbag assembly 50, i.e., an airbag module, which includes the airbag 16, an airbag housing 56, and an actuator 70. The airbag assembly 50 may be installed in the seat back 31, e.g., in the upper portion 32.

The airbag housing 56, as shown in FIGS. 1-2, support the airbag 16 and may support the actuator 70. The airbag housing 56 may be installed in the seat 14. The first side 28 of the airbag 16 may be attached to the airbag housing 56. The airbag housing 56 may be positioned in the upper portion 32 of the seat back 31. The airbag housing 56 may provide a reaction surface for the airbag 16 in the inflated position. The airbag housing 56 may be formed of any suitable material, e.g., a rigid polymer, a metal, a composite, etc.

The airbag 16 is inflatable from an uninflated position, as shown in FIG. 1, to the inflated position, as shown in FIGS. 2-5. The airbag 16 is supported by the seat 14. The airbag 16 may be supported by the upper portion 34 of the seat 14. The airbag 16 may be supported by the seat back 31.

The airbag 16 may be formed of a woven polymer or any other material. As one example, the airbag 16 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 3:
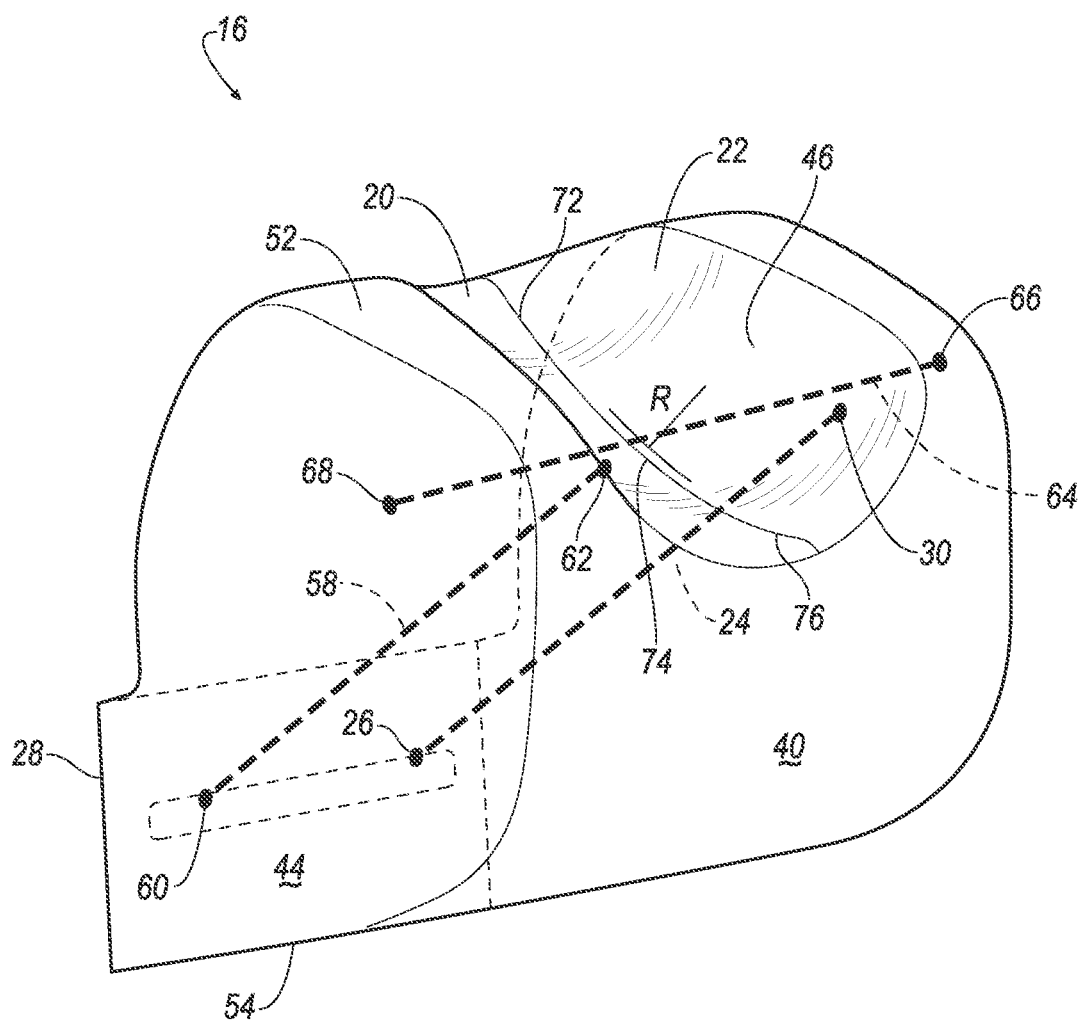
FIG. 3 is an isometric view of the airbag.
Figure 4:
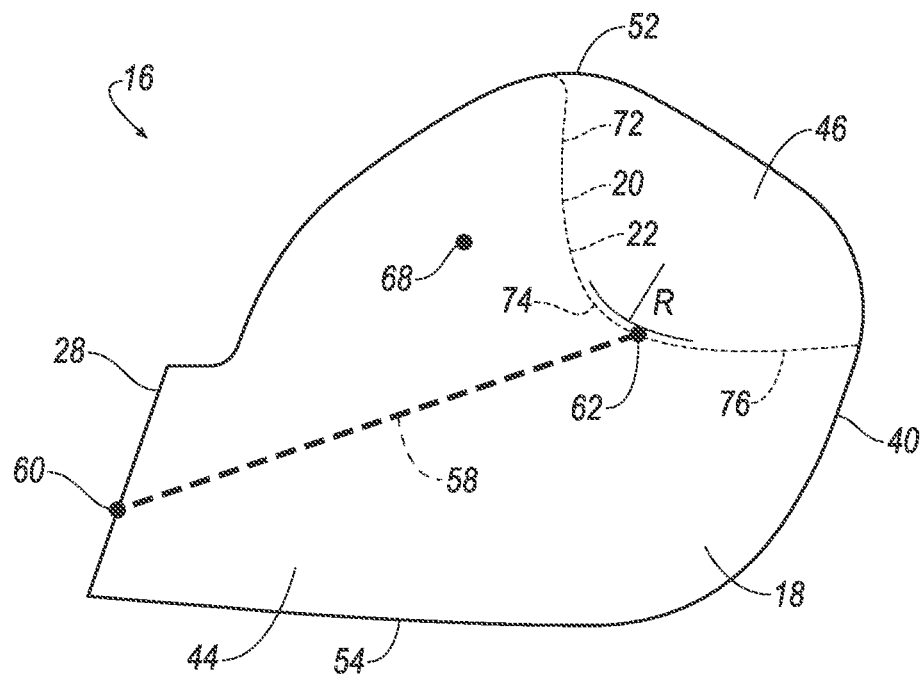
FIG. 4 is a side view of the airbag.

The airbag 16 includes at least one side, as shown in FIGS. 3-4. The airbag 16 may include a first side 28 and a second side 40 disposed opposite the first side 28. The airbag 16 may include a third side 42 and a fourth side 44 disposed opposite the third side 42, as shown in FIG. 4. The airbag 16 may include a top 52 and a bottom 54.

The airbag 16 includes the inflation chamber 18. The inflation chamber 18 may be a portion of an interior of the airbag 16 that receives inflation medium. As set forth below, the actuator 70 may generate inflation medium that flows into the inflation chamber 18, inflating the airbag 16. The inflation chamber 18 may support the occupant when the occupant engages the concave impact surface 22. The airbag 16 may include one or more vents (not shown) to control the pressure in the inflation chamber 18. The vents may be, e.g., active vents, dedicated vents, etc. The vents may allow inflation medium to exit the inflation chamber 18, allowing for control of the pressure of the inflation medium in the inflation chamber 18.

The airbag 16 includes the panel 20. The panel 20 may be a portion of the airbag 16 that receives the occupant. The panel 20 may be disposed in the second side 40 of the airbag 16 opposite the first side 28 of the airbag 16. The panel 20 is adjacent to the inflation chamber 18, i.e., with lack of another component between the panel and the inflation chamber 18.

Figure 5:
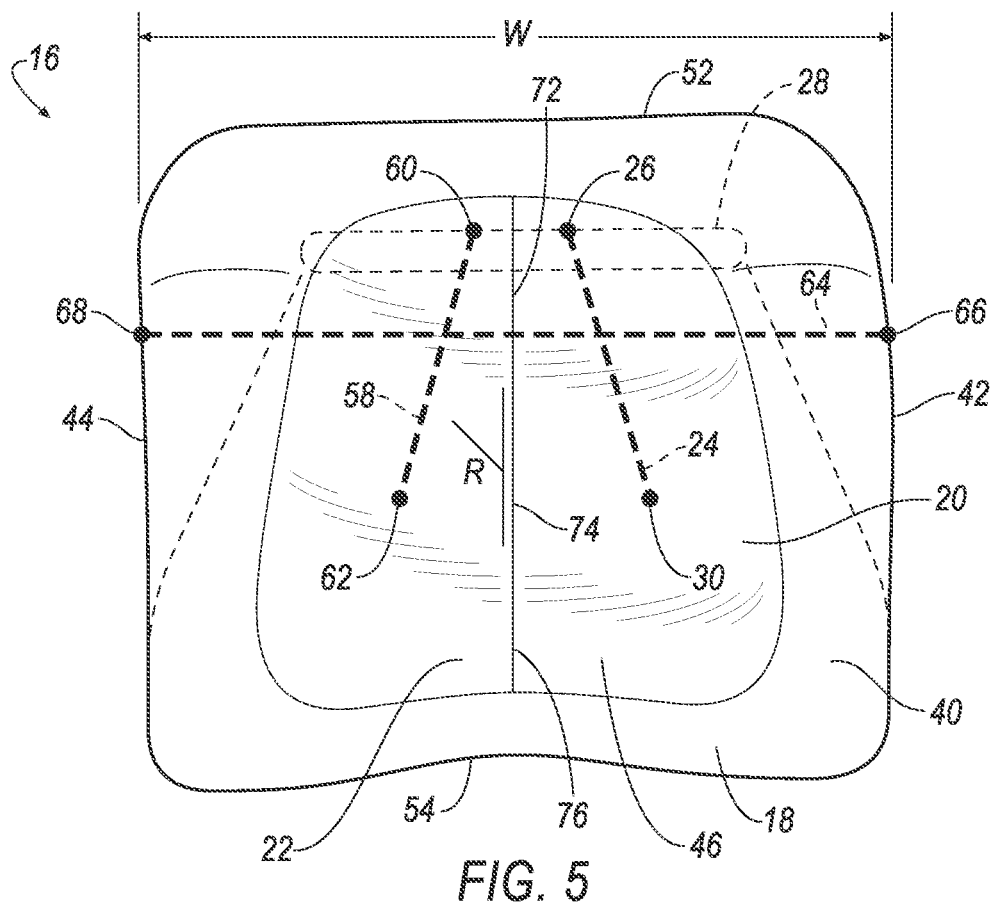
FIG. 5 is a front view of the airbag.

The inflation chamber 18 may be disposed between the bottom 54 of the airbag 16 and the panel 20. The inflation chamber 18 may extend from the first side 28 to the second side 40, as shown in FIGS. 2-5. As shown in FIG. 5, the inflation chamber 18 may extend from the third side 42 to the fourth side 44. The inflation chamber 18 may extend from the top 52 to the bottom 54 of the airbag 16. The inflation chamber 18 may extend toward the second seat 38 when the airbag 16 is in the inflated position, as shown in FIG. 2. The inflation chamber 18 may support the panel 20 as the panel 20 receives the occupant during the impact.

The panel 20 defines the concave impact surface 22. The concave impact surface 22 may receive the occupant during the impact. The inflation chamber 18 is beneath the concave impact surface 22 when the airbag 16 is in the inflated position. The concave impact surface 22 may define a void 46. The void 46 may receive the occupant's head during the impact.

The concave impact surface 22 may have a flat back 72, a curved portion 74, and a flat bottom 76, as shown in FIGS. 2-5. The curved portion 74 may have a concavity R. The concavity R is a measure of the curvature of the curved portion 74 and may be defined by a radius of curvature. The curved portion 74 may extend from the flat back 72 to the flat bottom 76. During the impact, the curved portion 74 and the flat bottom 76 may receive the occupant's head as the occupant moves downward into the void 46, and the flat back 72 and the curved portion 74 may receive the occupant's head as the occupant moves forward into the void 46. The flat bottom 76 may be disposed above the inflation chamber 18. The flat back 72 and the flat bottom 76 are generally flat, e.g., planar. It should be appreciated that the flat back 72 and the flat bottom 76 may have a slight curve due to the nature of the inflation of the airbag 16, i.e., rapid inflation of a flexible material. In examples where the flat back 72 and the flat bottom 76 have a slight curve, the slight curve of the flat back 72 and the flat bottom 76 is less than the concavity R of the curved portion 74, i.e., the flat back 72 and the flat bottom 76 are flat relative to the curved portion 74.

The system 10 includes the tether 24, as shown in FIGS. 3-4. The tether 24 has a first end 26 and a second end 30. The first end 26 is attached to one of the sides of the airbag 16, e.g., the first side 28. The second end 30 is attached to the panel 20 opposite the first side 28 of the airbag 16. The tether 24 may define the concavity R of the concave impact surface 22. The tether 24 may pull the panel 20 toward the first side 28 of the airbag 16, pulling the panel 20 toward the interior of the airbag 16 and curving the panel 20 to the concavity R. When the airbag 16 is in the inflated position, the tether 24 may extend from the first side 28 of the airbag 16 to the panel 20. The tether 24 may be constructed of any suitable material, e.g., fabric, an elastic polymer, a composite, etc.

The system 10 may include a second tether 58, as shown in FIGS. 3-4. The second tether 58 may have a first end 60 and a second end 62. The first end 60 of the second tether 58 may be attached to the first side 28 of the airbag 16 and the second end 62 of the second tether 58 may be attached to the panel 20. That is, the second tether 58 may extend from the first side 28 to the second side 40, and when the airbag 16 is in the inflated position, the second tether 58 may extend from the first side 28 to the panel 20. The first tether 24 may be spaced from the second tether 58. The first tether 24 and the second tether 58 each may pull on the panel 20, widening the void 46 and increasing a surface area of the concave impact surface 22 that may receive the occupant's head. Furthermore, the first tether 24 and the second tether 58 may be attached to the first side 28 such that the void 46 developed by the first tether 24 and the second tether 58 may receive occupants of differing sizes.

The system 10 may include a third tether 64, as shown in FIGS. 3-4. The third tether 64 may have a first end 66 and a second end 68. The third tether 64 may extend from the third side 42 of the airbag 16 to the fourth side 44 of the airbag 16. The first end 66 of the third tether 64 may be attached to the third side 42 and the second end 68 may be attached to the fourth side 44. The third tether 64 may define a width W of the airbag 16. When the airbag 16 is in the inflated position, the third tether 64 may pull on the third side 42 and the fourth side 44 of the airbag 16, restricting movement between the third side 42 and the fourth side 44. By restricting the width W of the airbag 16, inflation medium can move toward the second side 40 of the airbag 16, inflating the airbag 16 toward the second seat 38 and the occupant.

The system may include the actuator 70. The actuator 70 may be in fluid communication with the airbag 16. The actuator 70 can be programmed to inflate the airbag 16 to the inflated position upon detection of an impact. Upon receiving a signal from, e.g., a vehicle controller, the actuator 70 may inflate the airbag 16. The actuator 70 may be, e.g., a pyrotechnic inflator that uses a chemical reaction to drive inflation medium to the airbag 16. The actuator 70 may be of any suitable type, e.g., a cold-gas inflator.

During a vehicle impact, the actuator 70 may inflate the airbag 16 from the uninflated position to the inflated position. The tether 24 and the second tether 58 may pull on the panel 20, forming the concave impact surface 22. The panel 20 may form the concave impact surface 22 above the inflation chamber 18. The third tether 64 may pull on the third side 42 and the fourth side 44 of the airbag 16, restricting the width W of the airbag 16. The concave impact surface 22 may receive the occupant, and the inflation chamber 18 may absorb energy from the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a seat;
   an airbag including:
      a side;
      a second side spaced opposite the side in a vehicle-rearward direction;
      a third side extending from the side to the second side;
      a fourth side extending from the side to the second side, the third and fourth sides spaced opposite each other in a cross-vehicle direction;
      an inflation chamber between the side, the second side, the third side, and the fourth side; and
      a panel disposed in the second side and adjacent to the inflation chamber;
   a first tether having a first end attached to the side of the airbag and a second end attached to the panel; and
   a second tether having a first end attached to the third side of the airbag and a second end attached to the fourth side of the airbag;
   wherein the airbag is supported by the seat and is inflatable to an inflated position;
   wherein the panel defines a generally concave impact surface in a topmost portion of the airbag in the inflated position, the generally concave impact surface defining a flat back, a flat bottom, and a concave curved portion extending from the flat back to the flat bottom;
   wherein the inflation chamber is beneath the generally concave impact surface in the inflated position.

2. The system of claim 1, wherein the seat includes a seat back, and the airbag is supported by the seat back.

3. The system of claim 1, further comprising a second seat, wherein when the airbag is in the inflated position, the inflation chamber extends toward the second seat.

4. The system of claim 1, wherein the airbag includes a top and a bottom, and the inflation chamber is disposed between the bottom of the airbag and the panel.

5. The system of claim 1, wherein the seat includes an upper portion and a lower portion, and the airbag is supported by the upper portion.

6. The system of claim 1, further comprising an airbag housing, wherein the side of the airbag is attached to the airbag housing.

7. The system of claim 1, wherein the first tether defines a concavity of the generally concave impact surface.

8. The system of claim 1, wherein the seat includes a top and the generally concave impact surface extends above the top of the seat.

9. A system, comprising:
   a seat including a top;
   an airbag including:
      a side;
      a second side spaced opposite the side in a vehicle-rearward direction;
      a third side extending from the side to the second side;
      a fourth side extending from the side to the second side, the third and fourth sides spaced opposite each other in a cross-vehicle direction;
      an inflation chamber between the side, the second side, the third side, and the fourth side; and
      a panel disposed in the second side and adjacent to the inflation chamber;
   a first tether having a first end attached to the first side and a second end attached to the second side; and
   a second tether having a first end attached to the third side and a second end attached to the fourth side;
   wherein the airbag is supported by the seat and is inflatable to an inflated position;
   wherein the panel defines a generally concave impact surface in a topmost portion of the airbag in the inflated position, the generally concave impact surface defining a flat back, a flat bottom, and a concave curved portion extending from the flat back to the flat bottom;
   wherein when the airbag is in the inflated position, the airbag is disposed above the top of the seat and the inflation chamber is disposed beneath the generally concave impact surface;
   wherein when the airbag is in the inflated position, the first tether extends from the first side to the panel.

10. The system of claim 9, further comprising a third tether having a first end attached to the first side and a second end attached to the second side, wherein when the airbag is in the inflated position, the third tether extends from the first side to the panel.

11. The system of claim 9, wherein the first tether defines a concavity of the generally concave impact surface.

12. The system of claim 9, wherein the airbag includes a top and a bottom, and the inflation chamber is disposed between the bottom of the airbag and the panel.

13. The system of claim 9, further comprising a second seat, wherein when the airbag is in the inflated position, the inflation chamber extends toward the second seat.

14. The system of claim 9, further comprising an airbag housing, wherein the first side of the airbag is attached to the airbag housing.

15. The system of claim 9, wherein the seat includes an upper portion and a lower portion, and the airbag is supported by the upper portion.

16. The system of claim 9, wherein the generally concave impact surface extends above the top of the seat.

\* \* \* \* \*